Nov. 12, 1940.    S. HAYDEN ET AL    2,220,879
REMOVABLE HANDLE FOR UTENSILS
Filed June 9, 1938    2 Sheets-Sheet 1

Inventors:
Samuel Hayden
Clair J. Amick
By: John Howard Smith
Atty.

Nov. 12, 1940. S. HAYDEN ET AL 2,220,879
REMOVABLE HANDLE FOR UTENSILS
Filed June 9, 1938 2 Sheets-Sheet 2
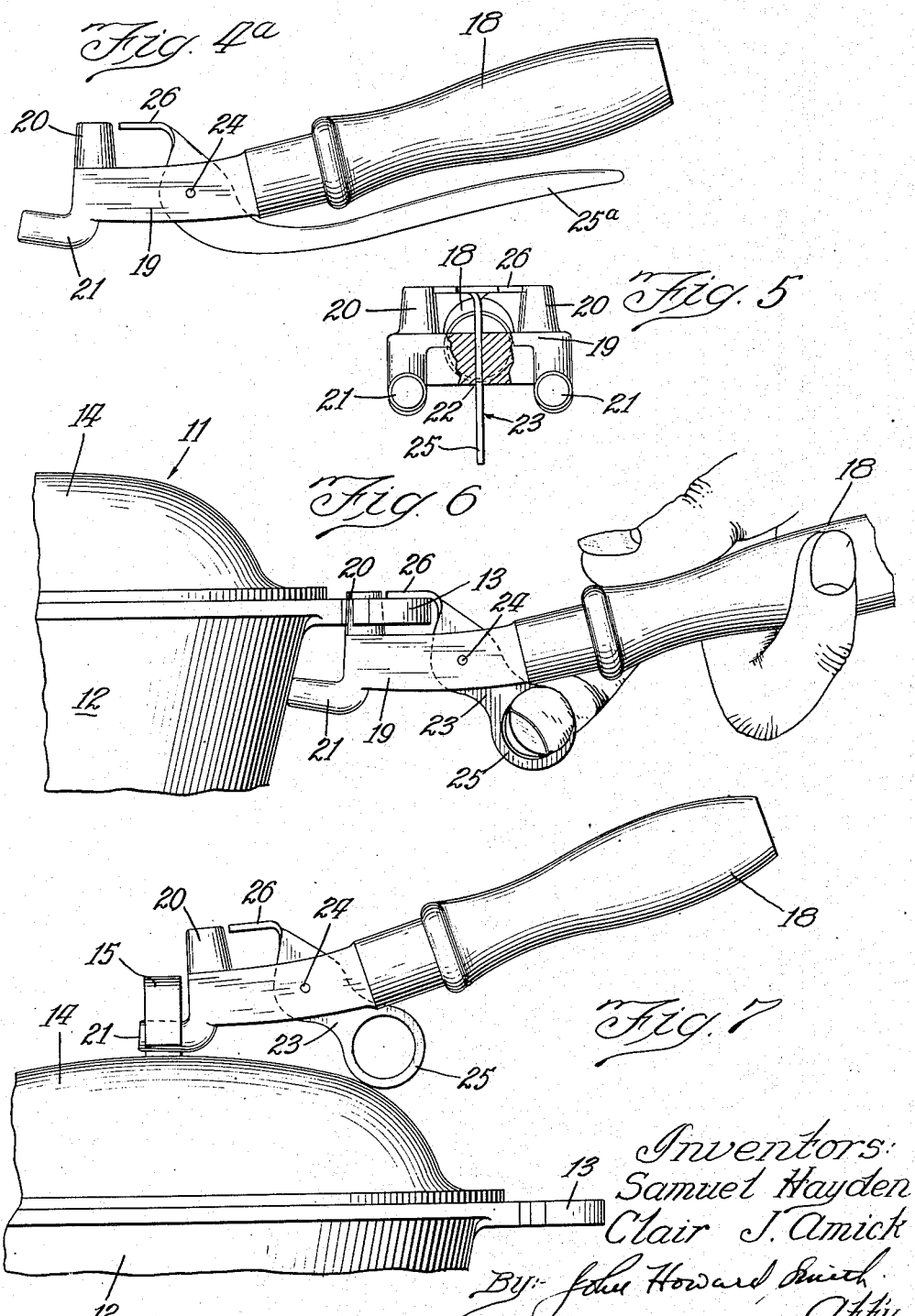

Patented Nov. 12, 1940

2,220,879

UNITED STATES PATENT OFFICE 2,220,879

REMOVABLE HANDLE FOR UTENSILS

Samuel Hayden, Chicago, Ill., and Clair Jacob Amick, Los Angeles, Calif., assignors to Century Metalcraft Corporation, Chicago, Ill., a corporation of Delaware Application June 9, 1938, Serial No. 212,736

13 Claims. (Cl. 53—8)

This invention is directed to cooking utensils and relates particularly to a detachable handle construction.

Such constructions are desirable because they permit storage of the utensils compactly; permit ready handling of the utensil without burning the hand; prevent the grip of the handle from being charred and loosened, and safeguard against the utensil and its hot contents being accidentally knocked from the range.

One of the important objects of the invention is to provide an improved handle construction of the above character which is universal in nature, in that it affords an efficient holder for the body of the utensil as well as for the lid thereof.

Detachable handle structures have, in the past, presented certain difficulties, among these being that the structure affording the junction has been of a character which is expensive to manufacture; that the junction has not provided the rigidity and strength necessary to create, in effect, a single unit between the handle and the utensil when the engagement is made; that the junction has been accomplished in a complex manner, and that the means forming the junction has been of such a character that it was difficult to keep clean and collected particles of food to become unsanitary.

To the end that the above disadvantages may be obviated, and to accomplish other objects of the invention, there is provided herein attachment means which is simple and cheaply manufactured; simple to operate; easy to keep clean and free from food; which affords a junction for the handle that gives maximum rigidity and strength by ensuring against relative movement between the utensil and the handle, and provides against the utensil slipping and falling from the handle.

More specifically it is an object of the invention to provide a handle with utensil body supporting elements, which elements are also adapted to cooperate with means on the utensil lid to form a rigid connection therewith.

Still another object of the invention is to provide an improved utensil and lid construction which is cheap to manufacture, easy to keep clean, and which affords an improved junction with a detachable handle.

A further object of the invention is to provide means on the handle portion of the assembly for affording a rigid junction with the utensil, which means comprises a plurality of elements substantially immovably engageable with the utensil through a plurality of receiving apertures and a plurality of other elements engageable against the wall of the utensil, said last named elements being engageable immovably with the lid of the utensil whereby the latter may be handled without danger of its twisting upon the handle or falling therefrom.

Still another object of the invention is to provide improved means for holding the utensil to the handle when the assembly is turned upside down for pouring, this means being simple and easy to operate and being of such a character that leverage advantage may be availed of to increase the holding action and reduce the effort required on the part of the user to accomplish such increased action.

Other objects and advantages will become apparent from the following description and accompanying drawings, in which.

Figure 1:
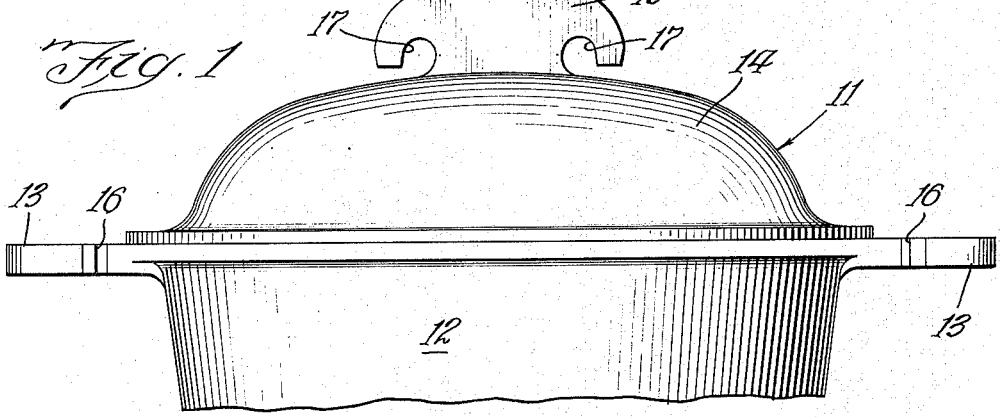
Fig. 1 is a fragmentary elevation of the pan and lid assembly to which the handle may be adapted.
Figure 2:
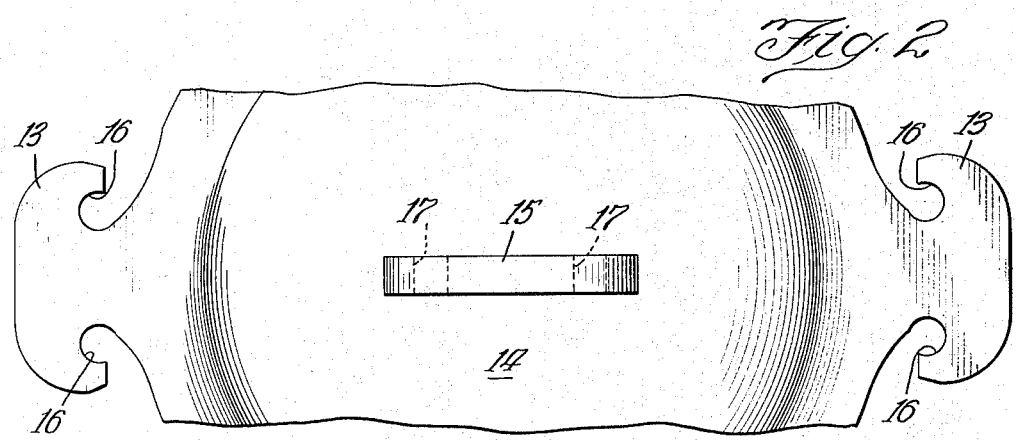
Fig. 2 is a top plan view of Fig. 1.
Figure 3:
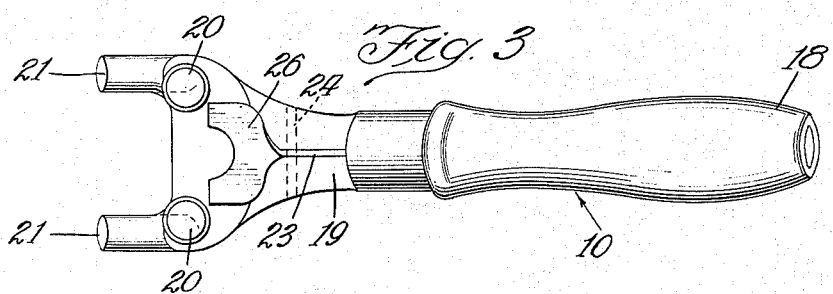
Fig. 3 is a top plan view of the handle.
Figure 4:
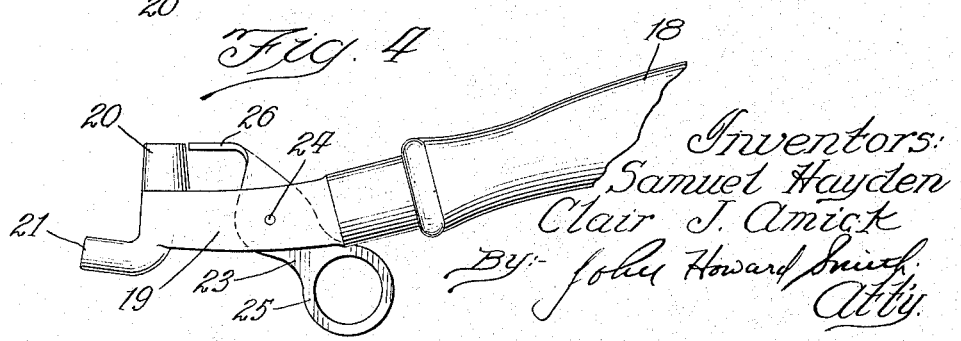
Fig. 4 is a side plan view of the handle.

Fig. 4—A is a side view of a modified form of the detachable handle;

Fig. 5 is a front view of the handle shown partly in cross section;

Fig. 6 is a fragmentary side view of the handle and the body portion of a cooking utensil showing the manner in which it is attached thereto; and Fig. 7 is a side view of the lid portion of the utensil and the handle showing the manner in which the latter is attached thereto.

It is to be understood that the embodiment disclosed herein is for illustrative purposes only and may be changed or modified without departing from the spirit or scope of the invention set out in the appended claims.

In the drawings, 10 represents the improved handle assembly generally, while 11 represents an exemplary utensil assembly including a body portion 12 having one or more lugs or ears 13 which extend outwardly of the rim thereof, and a lid 14 having a lug or ear 15 upstanding of the crown thereof.

As above stated, absolute rigidity in the junction of a handle with the utensil or lid is the optimum. However, it is desirable that this condition be accomplished with as simple and cheap a construction as possible, consequently there are drilled in each of the lugs 13 and 15 a plurality of spaced apertures or recesses 16 and 17 respectively. So far as the utensil and lid is concerned this is the extent of the structure required to accomplish the above stated objects, and thus it will be seen that there has been provided a structure which is simple, adds little to the cost of manufacturing the utensil and lid, since the lugs may be cast thereon and need only then be drilled, and which may be very easily kept clean.

The handle 10 includes a grip portion 18 and a body portion 19, the latter being shown herein as flattened in form and as being flared forwardly. At the forward end of the body 19 upstanding posts 20 are provided, these posts being of such a size and being so positioned that when the handle body 19 is held beneath a lug 13 they will extend snugly into and through the recesses 16 upon slight upward movement thereof. By the provision of a plurality of cooperating posts and holes it will be seen that a rigid non-pivotal junction is provided and that since the posts preferably fit snugly into the recesses, the handle may not be moved, even slightly, relative to the utensil except with up and down movement.

In order to provide supporting means which cooperate with the posts 20 to hold the utensil body rigidly upon the end of the handle, studs 21 are provided. These studs depend from the lower surface of the body 19 and have their free ends extending substantially longitudinally forwardly thereof whereby their front end surfaces abut the side of the utensil body when the posts 20 are in the recesses 16 at a plurality of points (see Fig. 6). Thus the utensil is supported against swinging movement downward relative to the utensil and, due to the plurality of abutment points provided by studs 21, the rigidity of the junction is further increased by the added resistance against sidewise motion of the handle relative to the utensil. Thus when the posts 20 are completely within the apertures 16 the handle is held against any movement relative to the utensil, except, as previously stated, downward movement of posts 20 out of the apertures 16. A further advantage of the above construction is that the utilization of the studs 21 with the multiple post-aperture combination shown gives a rigid junction yet obviates the necessity of great thickness in the lugs 13, since the studs prevent the utensil from swinging downwardly relative to the handle and the post-aperture combination prevents relative sidewise movement between the handle and the utensil.

With the foregoing construction it will be seen that when the handle is engaged to the utensil by slight upward movement to move posts 20 into apertures 16, there is provided a rigid, non-pivotal engagement whereby the utensil may be tipped to either side toward pouring position without pivotal movement between the handle and the utensil occurring, this having been accomplished without the use of interfitting slots and webs which increase the cost of production, and without irregularly shaped holes and studs which likewise are costly to manufacture.

As previously stated, the handle shown is universal in that it is equally well adapted to cooperate with means on the line 14. One of the disadvantages usually arising in the provision of a detachable handle for a lid is that the latter is usually associated with the former with a loose hanging, sliding engagement with the result that it tips or twists on the handle, slides thereon and easily falls off.

To the end that the above disadvantage may be obviated, and so that the lid may be easily and safely manipulated, there is provided herein an improved form of handle element for the lid. In the present embodiment this element comprises the ear 15 having recesses 17 drilled therein, this ear having the attributes (cheapness of manufacture, easiness to keep clean and the provision of a rigid junction) of the ears 13.

The recesses 17 are of such a size and so positioned that they receive the forward ends of studs 21 with a snug fit, whereby the lid is held on the handle non-pivotally and immovably except for the insertion of studs 21 into recesses 17, and will not readily fall therefrom (see Fig. 7).

From the foregoing it will be seen that there is provided herein a handle-utensil-lid assembly in which, while the handle is detachable, it may be attached through a rigid, subtantially integral junction with the lid or with the utensil, as the case may be. Furthermore, this superior junction is attained with inexpensive structures on the utensil which structures are simple and may be very easily kept clean.

While, with the above construction, the handle provides a rigid junction for the utensil body, it will be seen that if the latter is turned upside down as for pouring it will fall away from the handle.

To the end that the handle and utensil body may be held together in all positions, there is provided herein means for positively locking the ear 13 to the handle. This means is in the nature of a lever and is susceptible to being grasped by the hand which grasps the grip 18 of the handle. Furthermore, in the present embodiment it may be operated through a mere trigger-grip action of a finger of the hand holding the handle grip. This positive locking action is accomplished by a mere abutting engagement and without the aid of complex latches or the like, consequently the user need utilize only one hand and is not confronted with a complex operation in order to secure the handle and utensil body positively together.

In the present embodiment the body 19 of the handle has a substantially central slot 22 through which the element 23 extends. The element is retained pivotally within the slot 22 by means of a transverse journal 24 which is carried by the walls thereof.

At its relative lower end the element 23 has a finger engaging piece 25 and at its other end a lip 26 which extends forwardly of the body 19 toward posts 20. As will be seen from Fig. 6, the finger piece 25 preferably extends rearwardly to be accessible for manipulation by the hand holding the grip 18.

By reference to Fig. 6 it will be seen that the outer rim of the lug 13 extends rearwardly of the posts 20 when the latter are in the apertures 16, and that the lip 26 of the trigger-like element extends forwardly a sufficient distance to overlap the outer edge of said lug when the posts 20 are positioned within said apertures. When the grip 18 is grasped, one finger of the hand used may be extended beneath the grip and slightly forwardly to pass through the finger engaging portion 25 of the trigger-like element, and thus the element may be moved rearwardly and upwardly at its bottom portion with the result that the upper lip portion 26 moves forwardly and downwardly into abutment with the upper surface of the adjacent lug 13, thereby clamping the lug tightly down upon the posts so that when the handle and utensil are turned upside down they will not separate.

It will be readily understood that the utensil, which is normally of considerable weight, exerts considerable downward pressure when the assembly is turned upside down. Since, with the present construction the holding or locking action is attained solely through the pressure exerted by the hand of the user upon the finger piece 25, and since the locking action is present only at such times as the user's hand exerts such pressure, considerable reduction in the effort required to hold the utensil is desirable. With the present construction this reduction may be attained by adjusting the leverage advantage through properly proportioning the distance between the pivot 24 and the finger engaging piece to the distance between the pivot 24 and the lip 26. In the present embodiment the distance between the pivot and the finger piece is slightly greater than the distance between the pivot and the lip 26, with the result that the holding action of the lip is proportionately greater per unit of pressure exerted by the user on the finger piece. With such a construction the amount of finger pressure relative to the holding pressure is readily predeterminable and the holding action is entirely incidental to the normal gripping action on the handle. Furthermore, this holding action is more positive in that it relies entirely upon the movement of the finger of the user which engages the finger piece and may be released by slight movement of the finger. This avoids the use of automatic latches and snaps which are subject to failure when too great a weight is imposed thereon, and which, to be effective, must be in perfect working order. With the present construction no such failures are possible, since there is provided a simple form of mechanical action which does not independently perform the locking operation, but does so only in cooperation with the hand of the user.

While the finger piece 25 shown in Fig. 4 is found to be easily manipulated by a finger of the hand grasping the handle so that the manipulation of the locking element is entirely incidental to the gripping action by the user, there is provided in Fig. 4—A a modified form in which the trigger element 25a extends rearwardly coaxially with the grip 18 and consequently is normally enveloped by the forward end of the fingers as the grip 18 is grasped by the user.

Therefore, a more readily attachable and detachable handle, and one which functions completely under the influence of a single hand of the user, is provided. The flexibility of the above construction is particularly demonstrated by the fact that the lack of effort to hold the utensil to the handle, pointed out above, is maintained even when the handle disclosed herein is designed for extremely heavy pans, merely by lengthening the distance between the pivot 24 and the finger piece 25. It will be seen that the weight of the pan for which the handle is designed is limited only by the ability of the user to manipulate it on the end of a relatively long handle, since the actual added strain imposed upon the locking mechanism by the added weight of a pan is compensated for by properly determining the most advantageous leverage distance about the pivot 24, as above described.

Having thus described our invention what we claim as new and desire to secure by United States Letters Patent is:

1. In combination, a cooking utensil assembly including a body portion and a lid, lug elements associated with said body and said lid, a pair of recesses in each of said lug elements and a detachable handle, said handle having a grip portion and a body portion, a pair of posts upstanding of the upper surface of said body portion of the handle, each of said posts being positioned and having dimensions whereby it fits snugly into one of the recesses in the lug on the body portion of the utensil assembly upon upward movement of the handle toward the bottom of said last named lug, a pair of forwardly extending studs on said handle body, said studs being adapted to abut the side walls of the utensil body below the lug when said posts are in their respective recesses, each of said studs being positioned and having dimensions to fit snugly into one of the recesses in the lug on said lid when the handle is moved toward the side of said last named lug.

2. In a detachable handle for cooking ware, a grip portion and a forward body portion, a pair of posts upstanding of the forward portion of the upper surface of said body portion and a pair of studs depending from the lower surface of said body portion and extending substantially horizontally forward relative to said handle.

3. In a lid for a cooking utensil, a lid body, means to facilitate handling said lid, said means including a lug or ear extending substantially vertically of the upper side of said lid body, said lug or ear having a plurality of substantially horizontal, parallel recesses therein, said recesses being located in a single plane to facilitate attachment of a handle thereto.

4. The combination with a handle having a plurality of lid engaging elements thereon, of a utensil lid having an ear upstanding of the outer surface thereof and recesses in said ear, each of said recesses being adapted to receive one of said elements with snug interfitting engagement.

5. In a detachable handle for a cooking utensil, a grip portion and a body portion, means upstanding from the upper surface of said body portion for engaging a utensil, a substantially central slot in said body portion, a pivot pin extending through the walls of said slot and thereacross, utensil holding means extending through said slot and being pivotally held therein by said pin, said holding means having a finger engaging piece at its end extending below said body portion and having a utensil engaging lip at its end extending above said body portion, said lip extending forwardly into the vicinity of said means upstanding from the upper surface of said body portion and being movable toward and away from the upper surface of said body portion in response to movement of said finger engaging piece.

6. In a detachable handle for a cooking utensil, a grip portion and a body portion, means on said body portion for engaging said utensil with interfitting engagement, utensil holding means pivotally associated with said handle, said means having an operating portion extending toward the grip portion to be accessible to be operated by the hand grasping said grip portion and having a utensil engaging portion remote from the operating portion, said utensil engaging portion extending toward said utensil engaging means on the body portion of the handle and being adapted to urge said utensil into its interfitting engagement with said means upon the gripping of said operating portion.

7. In a cooking assembly including a utensil body and a detachable handle having a grip portion, means on said body and means on said handle for interfitting with one another to form a rigid junction between said handle and said body, means pivoted on said handle, said means having a manipulating portion extending to the vicinity of said grip portion of the handle to be accessible for manipulation by a hand grasping said grip portion and having an operating portion adapted to engage the utensil to urge it into interfitting engagement with said handle upon the gripping of said manipulating portion.

8. In a cooking utensil assembly, a utensil and a detachable handle having a grip portion, vertically extending means on said handle, a lug extending horizontally of said utensil, said lug being recessed vertically to receive said means on said handle, means pivotally associated with said handle, said last named means having an operating portion extending toward the grip portion of the handle to be operated by the hand grasping said grip portion and having a utensil engaging portion movable by manipulation of said operating portion to urge said utensil onto said vertically extending means on said handle.

9. In a cooking utensil assembly, a utensil and a detachable handle therefor, a lug extending substantially horizontally from the peripheral rim of said utensil, said lug affording a plurality of vertical recesses, a plurality of posts upstanding from the upper side of said handle, said posts being so positioned and having dimensions whereby they interfit snugly with said recesses when the handle is moved upwardly toward said lug from the under side thereof, said lug having an edge extending outwardly beyond the recesses therein, means for holding said posts in interfitting relationship with said recesses, said means including an intermediately pivoted trigger-like element associated with said handle, said element having a finger piece extending beneath the handle and to a position whereby it is accessible to be operated by the hand grasping the handle and having a substantially horizontal lip at its end remote from the finger piece, said lip extending forwardly of the handle toward said posts whereby it abuts the upper surface of the outer edge of said lug to force it downwardly upon the posts to hold the utensil and handle in secure interfitting relationship in response to manipulation of said finger piece by the hand grasping the handle.

10. In combination, a cooking utensil assembly including a body portion and a lid, means on said body portion affording a plurality of substantially vertically extending recesses, means on said lid affording a plurality of substantially horizontally extending recesses, and a detachable handle, said handle including a plurality of substantially vertically extending elements and a plurality of substantially forwardly, horizontally extending elements, said last named elements abutting the wall of the body portion of the utensil in supporting engagement when the first named elements engage in the substantially vertical recesses therein and being engageable in the recesses in said lid to handle the same.

11. In combination, a cooking utensil assembly including a body portion and a lid, a plurality of recesses in said body portion, a plurality of recesses in said lid and a detachable handle, a plurality of substantially vertical elements on said handle for engaging in said recesses in said body portion, and a plurality of elements extending substantially forwardly thereon, said last named elements being engageable with said recesses in said lid.

12. The combination with a utensil assembly including a lid and a container portion, said lid and container portion having attachment recesses, of a detachable handle, said handle having a rear gripping portion and a forward body portion, means on said body portion of the handle for engaging in the recesses of said container portion, means thereon for abutting the wall thereof during said engagement for providing a non-pivotal attachment, and means for engaging with the recesses of said lid.

13. In a detachable handle for cooking ware of the character having attachment recesses in the container portion and in the lid, in combination, elements engageable with said recesses in the body portion, means for engaging the outer side of the wall thereof to afford a non-pivotal attachment during said engagement, and elements engageable with said recesses in the lid for manipulation thereof.

SAMUEL HAYDEN.
CLAIR JACOB AMICK.